United States Patent
Todd

[11] 3,766,975
[45] Oct. 23, 1973

[54] DRINKING RECEPTACLE

[76] Inventor: Gary P. Todd, 1716 Mark Ln., Charleston, S.C. 20852

[22] Filed: Sept. 17, 1970

[21] Appl. No.: 73,053

[52] U.S. Cl.................. 165/74, 62/457, 220/17, 215/12 R, 62/371
[51] Int. Cl............................................. F28d 1/06
[58] Field of Search................. 165/74, 169; 229/1–5; 220/9 F, 13, 14, 17; 215/12 R, 12 A, 13 R; 62/457, 371

[56] References Cited
UNITED STATES PATENTS

| | | | |
|---|---|---|---|
| 3,067,896 | 12/1962 | Berg et al. | 215/13 |
| 3,205,677 | 9/1965 | Stoner | 62/457 |
| 3,247,302 | 4/1966 | Lewis | 215/12 A |
| 2,191,434 | 2/1940 | Alder | 220/17 X |
| 3,402,763 | 9/1968 | Peterson | 165/74 X |
| 2,759,337 | 8/1956 | Katz | 220/17 X |

*Primary Examiner*—Frederick L. Matteson
*Assistant Examiner*—Theophil W. Streule
*Attorney*—T. Russell Foster

[57] ABSTRACT

A drinking receptacle including an outer shell of insulating material and a metallic inner container with a cavity therebetween in which a heat transfer medium is disposed for the absorption of heat from potable material such as hot coffee in the container to reduce the temperature of the potable material to a temperature level suitable for drinking and to maintain this reduced temperature level for a prolonged period of time.

6 Claims, 3 Drawing Figures

PATENTED OCT 23 1973  3,766,975
FIG. 1
FIG. 2
FIG. 3
INVENTOR
GARY P. TODD
BY T. Russell Foster
ATTORNEY
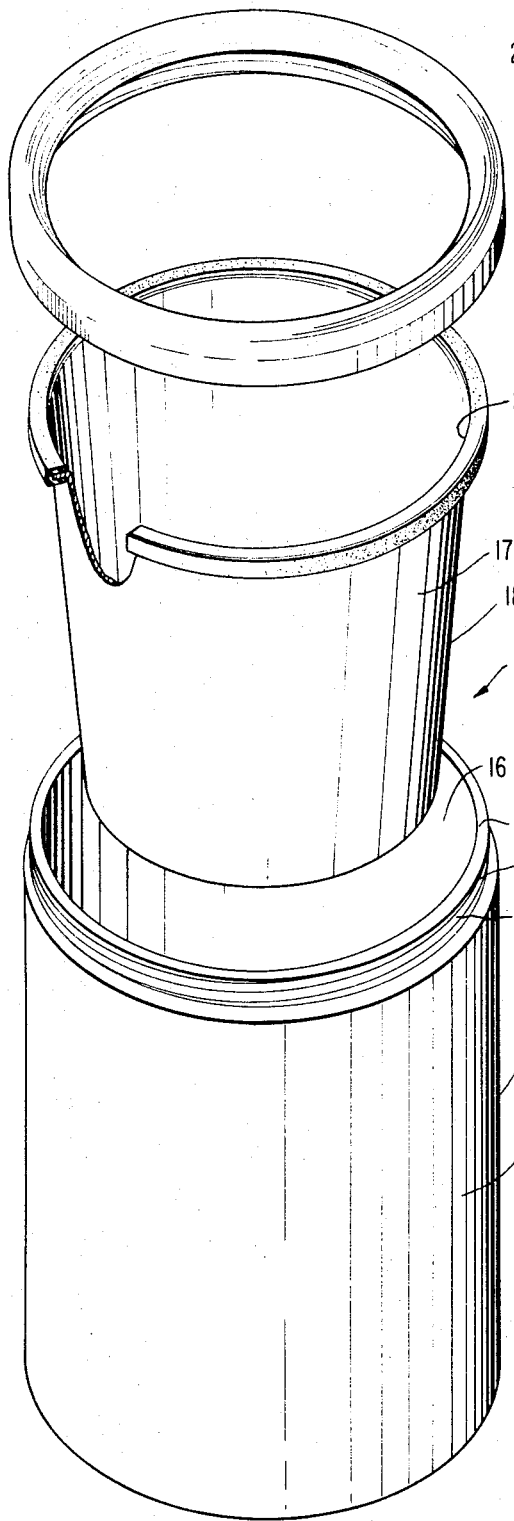
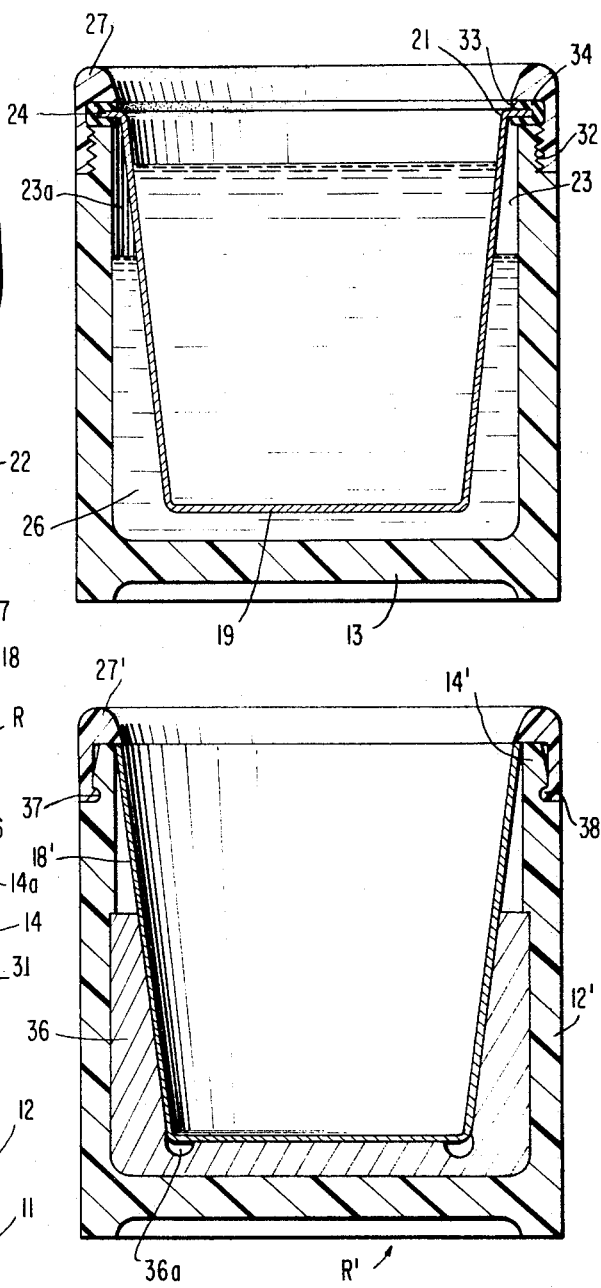

DRINKING RECEPTACLE

This invention relates to receptacles and more particularly to a drinking receptacle for hot liquids such as coffee, tea and the like.

As a general rule, potable liquids such as coffee, tea and the like, brewed in apparatus such as urns, percolaters etc. or prepared using so called "instant" materials added to water at a boiling temperature approach the boiling point of water when prepared for drinking with the result that they are generally too hot to be consumed by the average person. Some chilling effect on the hot brewed liquid is effected by the receptacle or vessel in which the liquid is prepared or poured but this temperature drop is usually quite small so that for the liquid to cool down to a suitable drinking temperature by simply waiting for an extended period of time or by utilizing such other measures as placing a metal spoon or similar utensil in the liquid to which heat is transferred. Either of these cooling measures require a waiting period which is a source of considerable annoyance to the drinker. Furthermore, even after waiting for the cooling period, the liquid continues to cool so before the liquid is completely consumed ii has dropped to a temperature less than that desired for the taste of the typical drinker.

Accordingly, a primary object of this invention is to provide a new and novel drinking receptacle for liquids such as hot coffee, tea or the like.

Another object of this invention is to provide a new and novel drinking receptacle which immediately reduces the temperature of hot potable liquids introduced therein to a comfortable drinking temperature.

A further object of this invention is to provide a new and novel drinking receptacle for hot liquids such as coffee, tea and the like in which liquids approaching the boiling point of water are immediately reduced to a comfortable drinking temperature, which continues to maintain this comfortable drinking temperature over an extended period of time and which permits the drinker to immediately consume the liquid therein without discomfort.

This invention further contemplates the provision of a new and novel drinking receptacle which is simple and inexpensive in construction and which is capable of repeated use without deterioration or leakage.

Other objects and advantages of the invention will become apparent from the following description taken in connection with the accompanying drawing.

The objects stated above and other related objects in this invention are accomplished by the provision of an outer shell of insulating material such as foam plastic in the interior of which is supported an inner container of heat conductive material such as metal. An annular cavity is provided between the outer shell and inner container in which is disposed a heat transfer medium such as water so that heat is transferred from hot potable material in the container to the heat transfer medium to immediately reduce the temperature of the potable material to a selected level while the reduced temperature of the potable material is maintained at this selected level for a prolonged period of time.

The novel features which are believed to be characteristic of the invention are set forth with particularity in the appended claims. The invention itself, however, both as to its organization and method of operation may be best understood by reference to the following description taken in conjunction with the accompany drawing in which:

FIG. 1 is an exploded perspective view of a receptacle constructed in accordance with the invention;

FIG. 2 is a sectional view of the receptacle FIG. 1 in the assembled condition; and FIG. 3 is a view similar to FIG. 2 showing a modification of the invention.

Refering now to the drawing and to FIG. 1 in particular, there is shown a receptacle constructed in accordance with the invention and designated generally by the letter R. The receptacle R includes an outer shell 11 of insulating material such as foam plastic or the like which is preferably substantially circular in cross-sectional shape. The shell 11 includes a side wall 12, a bottom wall 13 and an annular upper edge portion 14 defining a ledge 14a and a interior 16.

The receptacle R also includes an inner container 17 formed of heat conductive material such as metal or the like which is supported on the outer shell 11 in the assembled condition of FIG. 2 within the shell interior 16. The container 17, into which hot potable material such as hot coffee, tea or the like is to be introduced, is preferably of cup-shaped configuration having a downwardly tapered side wall 18, a bottom wall 19 and an annular upper edge portion 21 defining an opening 22.

As shown best in FIG. 2, the container side wall 18 and bottom wall 19 are arranged in spaced apart relationship with the side wall 12 and bottom wall 13 of the outer shell 11 to define therebetween a cavity 23. The container 17 is preferably provided with a laterally extending, annular flange 24 which, in the assembled condition of the receptacle R, is positioned in overlying relationship with the ledge 14a of the shell edge portion 14 as shown best in FIG. 2.

A heat transfer medium 26 is contained within the cavity 23 in heat transfer relationship with the inner container 17 for absorbing heat from the potable material introduced into the container. In the embodiment of FIGS. 1, 2, this heat transfer medium is water and preferably the cavity 23 is not completely filled with the heat transfer medium 26 to form an air pocket 23a thereby permitting the medium or water 26 to expand freely.

The receptacle R also includes an annular cap member 27 similarly formed of insulating material such as plastic foam or the like which is detachably mounted on the outer shell upper edge portion 14 in sealing relationship therewith and in overlying relationship with the container flange 24.

In the embodiment of FIGS. 1, 2, the cap member 27 is detachably mounted on the shell 11 by a threaded connection formed by the provison of external threads 31 on the shell upper edge portion 14 and internal threads 32 on the inner surface of the cap member 27. As shown, inner wall of the cap member 27 is cut away to form a shoulder 33 which is positioned in overlying relationship with the container flange 24 and the ledge 14a of the shell 12. In addition, an annular gasket 34, preferably U-shaped in cross-section, is positioned between the cap member 27 and the ledge 14a of the outer shell upper edge portion 14 in sealing relationship with the container flange 24 thereby providing a positive seal to prevent leakage through the joint between the cap member 27 and outer shell 11 in the assembled condition of the receptacle R of FIG. 2.

In the embodiment of FIG. 3, wherein like numerals are utilized to identify like parts, a modified receptacle R' is shown wherein flange 24 of the inner container is omitted to provide a modified container 18'. The heat transfer medium in the embodiment of FIG. 3 comprises a metallic material such as aluminum, copper or the like which is identified by the numeral 36 and which supports the container 18' in the shell interior 16' in the assembled condition of FIG. 3. It will be noted that the metallic heat transfer medium 36 is provided with an annular groove 36a to permit expansion of the metal container 18' upon the introduction of hot potable material therein.

In the embodiment of FIG. 3, the cap member 27' is detachably mounted on the outer shell 12' by providing an annular groove 37 in the upper edge portion 14' of the shell side wall 12'. The groove 37 is arranged to accommodate an annular internal bead 38 on the inner wall of the cap member 27'.

In the use of both embodiments R, R' of the receptacle of the invention, hot potable material such as hot coffee may be introduced into the receptacles for drinking and as a result of the heat transfer mediums 26, 36 of receptacles R, R' the hot material is quickly reduced to a "sipping" temperature by transfer of heat from the material of the "heat sink" or heat transfer mediums 26, 36. This "sipping" temperature is determined by the initial temperature, specific heat, mass etc. of the mediums 26, 36 as well as the temperature, volume, etc. of the potable material introduced into the containers 18, 18'. After this "sipping" or terminal temperature is reached, this temperature of the potable material in the container 18 is maintained by the outer shells 12, 12' for a prolonger period of time due to their insulating properties.

As can be seen, the use of insulating material for the cap members 27, 27' provides for pleasant drinking of the potable material in the receptacles R, R' without discomfort to the drinker. Furthermore, such plastic foam material has virtually no effect on the taste of the material in the containers 18, 18'. It should also be understood, that as a result of the novel construction of the invention, the receptacles R, R' may be precooled in a freezer or the like following which a cold beverage introduced in the containers 18, 18' may be maintained in the cooled condition for a prolonged period of time without dilution.

While there has been described what at present is considered to be the preferred embodiment of the invention, it will be understood by those skilled in the art that various changes and modifications may be made therein without departing from the invention.

Having thus described the invention; what is claimed is:

1. A drinking receptacle comprising, in combination, a rigid outer shell of insulating material having an annular upper edge, a rigid inner container of heat-conductive material having an annular upper edge, means for interconnecting said inner container and said outer shell upper edges together in intersecting sealing engagement to support said inner container within said outer shell in spaced relationship therewith for providing an inner cavity therebetween, said interconnecting means being arranged to form an annular lip for accommodating the mouth of a drinker to permit drinking of a potable liquid from said inner container and a heat transfer medium in said cavity in heat transfer relationship with said inner container for the absorption of heat from potable material introduced into said inner container, said heat transfer material being of a selected quantity to reduce the temperature of said potable material to a level whereby said outer shell maintains the temperature of said potable material at said selected level.

2. A drinking receptacle in accordance with claim 1 wherein said inner container is formed of metal.

3. A drinking receptacle in accordance with claim 1 wherein said heat transfer medium is metal.

4. A drinking receptacle in accordance with claim 1 wherein said heat transfer medium is a liquid.

5. A drinking receptacle in accordance with claim 4 wherein said outer shell is formed of expanded plastic form material.

6. A drinking receptacle in accordance with claim 5 wherein said inner container is of cup-shaped configuration having a downwardly tapered side wall and a bottom wall and wherein said inner container annular upper edge defines an opening and wherein said outer shell is of substantially circular, cross-sectional shape having a side wall and a bottom wall and wherein said outer shell annular upper edge includes a ledge and wherein said interconnecting means includes a laterally extending, annular flange on said inner container upper edge positioned in overlying relationship with said ledge for supporting said inner container on said outer shell, an annular cap member of insulating material disposed on said outer shell upper edge in sealing relationship therewith and in overlying relationship with said flange and an annular gasket positioned between said cap member and said ledge in sealing relationship with said flange.

* * * * *